United States Patent [19]

Kobayashi et al.

[11] 3,957,474
[45] May 18, 1976

[54] METHOD FOR MANUFACTURING AN OPTICAL FIBRE

[75] Inventors: Soichi Kobayashi, Mito; Tatsuo Izawa, Musashino, both of Japan

[73] Assignee: Nippon Telegraph and Telephone Public Corporation, Tokyo, Japan

[22] Filed: Apr. 17, 1975

[21] Appl. No.: 569,113

[30] Foreign Application Priority Data
  Apr. 24, 1974  Japan.................. 49-45471
  Apr. 30, 1974  Japan.................. 49-48586

[52] U.S. Cl. ................... 65/3 A; 65/18; 65/60 D; 65/120; 106/50; 156/605; 156/615; 427/53; 427/163; 65/DIG. 7
[51] Int. Cl.² ............... C03C 25/02; C03C 13/00
[58] Field of Search ............. 65/3 A, 18, 120, 60 D, 65/DIG. 7; 427/53, 163; 106/50; 156/615, 605

[56] References Cited
UNITED STATES PATENTS

| | | | |
|---|---|---|---|
| 3,224,840 | 12/1965 | Lefever................. | 156/615 X |
| 3,476,640 | 11/1969 | Sirtl et al............. | 65/18 X |
| 3,661,637 | 5/1972 | Sirtl.................... | 427/53 |
| 3,726,656 | 4/1973 | Reid et al............. | 65/3 A |
| 3,741,796 | 6/1973 | Walker................. | 65/18 X |
| 3,823,995 | 7/1974 | Carpenter............. | 65/3 A X |
| 3,826,560 | 7/1974 | Schultz................. | 65/3 A X |
| 3,864,113 | 2/1975 | Dombaugh et al..... | 65/3 A X |
| 3,892,540 | 7/1975 | Cioccolani............ | 156/615 |

FOREIGN PATENTS OR APPLICATIONS

| | | | |
|---|---|---|---|
| 1,471,446 | 1/1969 | Germany............. | 156/615 |

OTHER PUBLICATIONS
Journal of Material Science (1970) pp. 978–982, Thin Films of Semiconductors and Dielectrics Produced by Laser Evaporation — by U. S. Ban, D. A. Kramer.

*Primary Examiner*—S. Leon Bashore
*Assistant Examiner*—Frank W. Miga
*Attorney, Agent, or Firm*—Sughrue, Rothwell, Mion, Zinn & Macpeak

[57] ABSTRACT

A method for manufacturing a glass core rod and a cladding layer clothing the glass core rod applied successively or continuously by using a carbon dioxide gas laser. A refractory mandrel is heated by means of carbon dioxide gas laser irradiation and a mixed gas of oxygen and pure silicon tetrachloride vapor and a dopant compound vapor is ejected to the refractory mandrel so as to deposit silicon oxide and oxide of the dopant compound on the mandrel and to form a glass core by fusing it. Further heating is applied by irradiation by the carbon dioxide laser beam on the glass core and a mixed gas oxygen and pure silicon tetrachloride vapor and a dopant compound vapor or of oxygen gas and pure silicon tetrachloride vapor to deposit silicon oxide and oxide of the dopant compound or silicon oxide on the glass core to form a cladding layer of fused silica or fused silica containing the dopant. The preform thus formed by the glass core and the cladding is heated above the softening temperature of the preform so as to spin to form an optical fibre. The method uses laser beam heating which results in less degree of contaminating impurity and water content which might cause absorption and scattering of light also to manufacture an optical fiber having less variation at the boundary of the glass core and the cladding layer.

14 Claims, 4 Drawing Figures

METHOD FOR MANUFACTURING AN OPTICAL FIBRE

BACKGROUND OF THE INVENTION

1. Field of the Invention

The present invention relates to a method for manufacturing an optical fiber having a glass core rod and a cladding glass layer clothing the glass core rod manufactured either successively or continuously by using a carbon dioxide gas laser beam.

2. Description of the Prior Art

An optical waveguide having a doped fused silica glass core and a glass cladding layer formed of a pure fused silica or doped fused silica has been known. The method for manufacturing such an optical waveguide is known, for instance, by U.S. Pat. No. 2,326,059 in which a flame hydrolysis process is applied. In one known method for manufacturing such an optical fiber, a doped fused silica core rod which is doped in an amount to increase its refractive index by a desired level is inserted into a pure fused silica tube and the combination is heated up to a temperature to cause a sufficient elasticity to be achieved, then the combination of the tube and the rod is drawn to decrease the cross-section in a desired dimension at which the tube is collapsed about the rod and is fused together with the core. In another known method, a pure fused silica tube is used and solid particles of silicon oxide and that of the oxide of dopant are deposited on the inner wall of the tube and the tube is heated above its softening temperature and extended by drawing. In this method the cross-section of the tube is decreased while sintering the solid particles on the inner wall to form a solid optical fiber.

In the flame hydrolysis process for the manufacture of the glass core and the cladding layer, however, it is known that a water content of about 1,000 ppm may often be contained in glass which causes trouble in the practical use. Machining or surface working of the glass core rod may cause contamination by an impurity in the glass or it may result in variation of the composition at the surface layer of the glass which results in a scattering loss of the optical waveguide.

SUMMARY OF THE INVENTION

The present invention is to provide a method for manufacturing an optical fiber having very low loss such as scattering loss, absorption loss or radiation loss which may be caused by working of the glass to form a waveguide. In the process of the present invention, a glass core rod and a glass cladding layer clothed on the core rod may be manufactured successively or continuously by using a carbon dioxide gass laser beam.

According to the method of the present invention a fused silica glass core containing dopant may be manufactured under a process in which a rotatable and axially movable refractory mandrel is heated at a high temperature by an irradiation of a laser beam and a mixed gas of oxygen and an oxidizable silicon compound vapor and a vapor of a dopant for the glass consisting of an oxidizable compound is ejected onto the heated portion of the refractory mandrel so as to deposit silicon oxide and oxide of the dopant thereon and at the same time to fuse the deposite to form a glass core. According to further aspect of the present invention a cladding glass layer is formed on the glass core, in a step that the surface of the aforementioned fused silica glass core containing a dopant is heated at a high temperature by irradiation of a carbon dioxide gas laser beam and at the same time by ejecting a mixed gas of oxygen and oxidizable silicon compound vapor onto the surface so as to deposit silicon oxide on the surface of the glass core. An optical fiber is obtained by heating the preform thus obtained and having the glass core and cladding glass layer above its softening temperature and by spinning it.

In brief the present invention offers a novel method for manufacturing an optical fiber using a carbon dioxide gas laser.

The present invention has for its object to provide a novel method for manufacturing a low loss optical fiber.

The method for manufacturing an optical fiber according to the present invention is suitable for continuous production and for obtaining such fiber having a uniform diameter and even quality.

DESCRIPTION OF THE PREFERRED EMBODIMENT

The invention will be explained in more detail by referring to the accompanied drawings.

Figure 1:
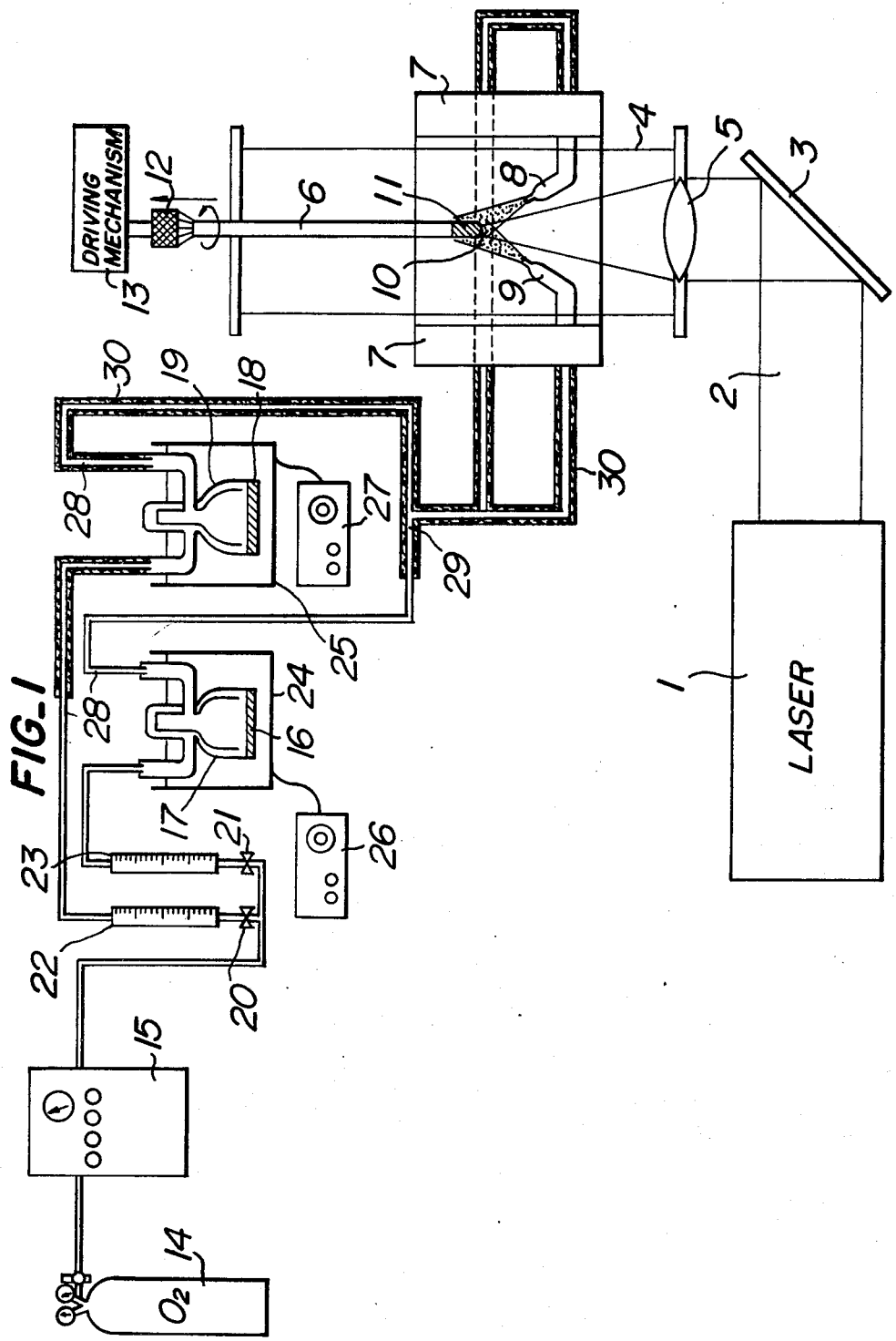
FIG. 1 is a schematic diagram showing the glass core manufacturing apparatus according to the present invention.

FIG. 1 shows the apparatus for manufacturing the glass core according to the present invention. In FIG. 1, 1 shows a laser source for instance a carbon dioxide gas laser emitting carbon dioxide gas laser beam 2 of 200 W. The emitted laser beam 2 is reflected by a metal mirror 3 and collected by a germanium convex lens 5 mounted at the bottom surface of a silica glass vessel 4. The focussed and condensed laser beam 2 irradiates an end of a refractory mandrel 6 of silica or high temperature refractory material arranged in the silica glass vessel 4 to heat at a temperature of 1,600° to 1,800°C. Around the silica glass vessel 4 a coil furnace 7 may be provided so as to preheat the container about 1,000°C. The metal mirror 3 may be by a beam scanner. In this case the convex lens 5 may be dispensed with. The beam scanner deflects the laser beam 2 by an angle $\theta$ at frequency of 20 Hz controlled by means of a function generator and a driving means to irradiate the end of refractory mandrel 6 by the homogeneously distributed carbon dioxide gas laser beam.

The refractory mandrel 6 is rotated, for instance, at 40 revolution per minute, by a driving mechanism 13 and also it is moved upward at low speed, for instance, 15 mm/hour which is equal to the growing speed of the fused glass on the refractory mandrel 6.

A mixed gas 10 of oxygen gas and pure silicon tetrachloride vapor and pure aluminum trichloride vapor ejected from nozzles 8 and 9 housed in the silica glass vessel 4 is directed to the refractory mandrel 6. As the result, the following reaction is carried at the end portion of the refractory mandrel 6.

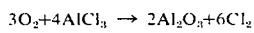

The silicon tetrachloride and the aluminum trichloride react with oxygen gas and change into their respective oxides. The silicon oxide and the aluminum oxide deposit on the refractory mandrel 6 and form a $SiO_2.Al_2O_3$ glass core 11. In the same rate of the growth of $SiO_2.Al_2O_3$ glass core 11, the refractory mandrel 6 is moved upward or in a counter direction with the direction of the growth of the $SiO_2.Al_2O_3$ glass core by the driving mechanism 13 while rotating at a slow speed. Instead of the above mentioned aluminum trichloride, triisobutylaluminum may be used. By the above process the deposited $SiO_2.Al_2O_3$ glass core 11 forms a glass core rod having a substantially constant diameter and uniform quality.

For example, a core rod of 10 mm in diameter and 45 mm in length (10 mm$\phi$ × 45 mm) may be obtained by a treatment for 3 hours and of which the weight is about 8 grams. The deviation of the diameter is only about ±100 $\mu$m.

As an oxidizable compound of silicon, silicon tetrachloride can be used. The dopants for the glass consisting of oxidizable compounds may be aluminum trichloride, triisobutylaluminum, germanium tetrachloride, titanium tetrachloride or a compound selected from a group consisting of gallium chloride, oxyphosphate and trimethylgallium, which varies the refractive index of the glass as has been well known in the art. Besides of the above compounds, chlorides of tantalum, tin, niobium, zirconium, or gallium may be used.

The mixtures of oxygen gas and high purity silicon tetrachloride vapor and that of aluminum trichloride vapor fed to the nozzles 8 and 9 can be obtained by purifying and mixing in the steps set forth below.

An oxygen gas is supplied from an oxygen gas source 14 through a purifier 15 into two routes by means of valves 20 and 21. The one flow of the oxygen gas is introduced into a saturator 17 containing highly purified silicon tetrachloride 16 and the other flow of the oxygen gas is introduced into a saturator 19 containing highly purified aluminum trichloride 18. The flow rates of the respective oxygen gas flows may be so adjusted by the valves 20 and 21 as to be indicated at a same value by flow meters 22 and 23 for instance, at a value of 1 l/min. In order to decide the content rate between $SiO_2$ and $Al_2O_3$ of the $SiO_2.Al_2O_3$ glass 11 at a desired value, the vapor pressure of the silicon tetrachloride 16 and that of aluminum trichloride 18 are previously set. For obtaining the previously set vapor pressure, the temperatures of heating baths 24 and 25 are adjusted by temperature controllers 26 and 27 and the temperatures of the respective saturators 17 and 19 are decided. The oxygen gas passing through the saturators 17 and 19 carries the vapor of the silicon tetrachloride 16 and the vapor of the aluminum trichloride 18 and forms a mixed gas thereof at a joint 29 of Teflon (tradename) tube or glass pipes 28. The mixed gas is delivered to the nozzles 8 and 9 mounted in the silica glass vessel 4 and ejected therefrom to hit the refractory mandrel 6 made of, for instance, silica and becomes $SiO_2.Al_2O_3$ glass core 11 by the heating of the laser beam 2.

As a practical embodiment, if we select the temperature of silicon tetrachloride 16 at 10°C and that of aluminum trichloride 18 as 130°C, the vapor pressures become 120 mmHg and 10 mmHg, respectively. Then if we adjust the amount of flow of oxygen to be constant, the mole ratio of the obtained $SiO_2.Al_2O_3$ glass will be $SiO_2:Al_2O_3=96\%:4\%$. The refractive index of the obtained glass is 1.466. This means that a glass having a refractive index higher than that of pure silica by about 0.008 may be obtained in accordance with the process of the present invention.

As the temperature of the saturator 19 for the aluminum trichloride is kept higher than room temperature, the portion of the Teflon (tradename) tube or glass pipe 28 through which the aluminum trichloride vapor is led to nozzles 8 and 9, is heated by a surrounding heater 30 to keep it over 30°C in order to avoid condensation of the aluminum trichloride vapor in the pipe 28.

By carrying out the reaction for obtaining silicon oxide from a pure silicon tetrachloride under the temperature of the heating furnace and by sintering the deposited silicon oxide on the refractory mandrel by the laser beam, the efficiency of producing the glass can be improved. In order to obtain a uniform power distribution, the laser beam may be reconcentrated after dividing the wavefront or the beam may be rotated about a center located at an eccentric position. The irregularity in the diameter or non-stability of the growing rod depends on the unevenness of the mode distribution of the laser beam. Therefore unevenness of the mode distribution can be compensated for by adjusting the angle between the incident laser beam and the refractory mandrel.

It is very important to grow the glass by suitably irradiating the laser beam to the refractory mandrel. The optical system for guiding the carbon dioxide gas laser beam is so arranged on a surface plate as to be adjusted at an accuracy of 10 $\mu$m. The detail of which is not shown in FIG. 1 for simplicity. After obtaining a stable growth of the glass rod, the power of the laser beam, position of the laser beam, the moving speed of the refractory mandrel and the number of rotations of the same, the amount of flow of the mixed gas and the temperature thereof and the relative position of the nozzle may be carefully controlled in order to maintain a stable condition. The above mentioned factors may be automatically controlled by using known art and a stable manufacturing condition can be obtained.

Figure 2:
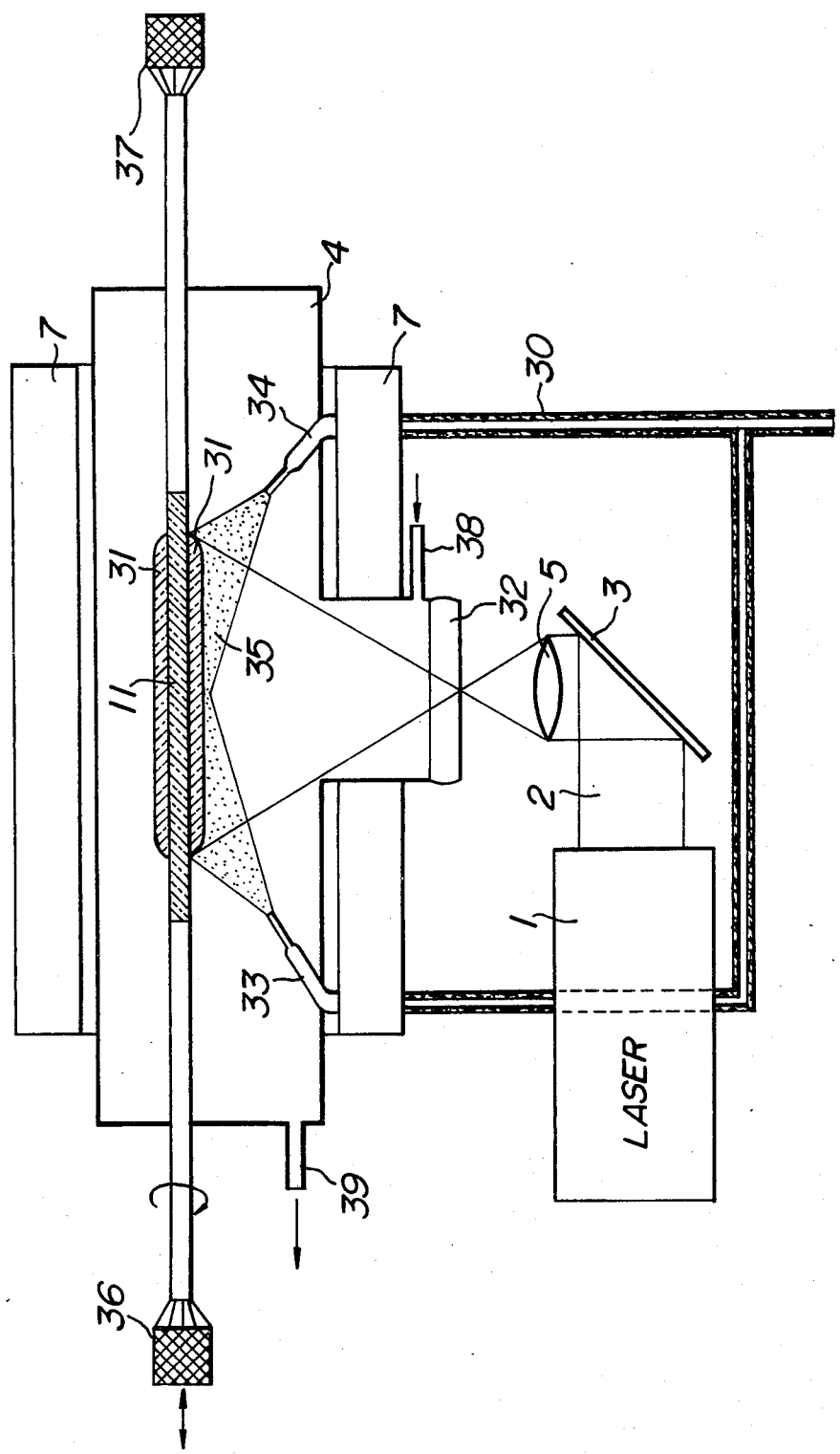
FIG. 2 is a schematic diagram showing an apparatus for clothing high purity silicon dioxide or high purity silicon dioxide and dopant oxides.

FIG. 2 shows one embodiment of a manufacturing apparatus in which $SiO_2.Al_2O_3$ glass core rod 11 manufactured by the method as explained by referring to FIG. 1 is clothed with a high purity $SiO_2$ glass 31 or silicon oxide with oxide dopant. The detailed function of the apparatus will be explained by referring to several embodiments.

EXAMPLE 1

A laser beam 2 emitted from a carbon dioxide gas laser 1 is reflected by a metal mirror 3 and collected by a germanium convex lens 5 and by a germanium cylindrical lens 32 provided on the side surface of a silica glass vessel 4 and irradiates an $SiO_2.Al_2O_3$ glass rod 11 in the vessel 4 and heats it to about 1,600°–1,800°C. An oxygen gas inlet tube 38 for supplying oxygen gas for protecting the cylindrical lens 32 is provided with the vessel 4. Further an exhaust tube 39 for the oxygen gas is provided thereon. The metal mirror 3 and the cylindrical lens 32 can be replaced by a beam scanner. The beam scanner may be driven by a function generator and a driving means at a suitable frequency and a suitable rotating angle to irradiate the glass core 11 by a uniform power distribution of the carbon dioxide gas laser beam.

The heating can be effected even using only the carbon dioxide gas laser. However, a circular furnace 7 may additionally be provided around the silica glass vessel 4 so as to preheat the rod to about 1,000°C and thereafter the rod is heated by the carbon dioxide gas laser beam to about 1,600°–1,800°C. Simultaneously with the heating, silicon tetrachloride vapor carried by oxygen gas 35 may be ejected from nozzles 33 and 34 arranged in the vessel 4 toward the $SiO_2.Al_2O_3$ glass core rod 11. As the result, the silicon tetrachloride reacts with the oxygen gas on the glass rod 11 according to the following equation to form silicon oxide.

$$O_2 + SiCl_4 \rightarrow SiO_2 + 2Cl_2$$

This silicon oxide deposits on the $SiO_2.Al_2O_3$ glass core rod 11 to form $SiO_2$ glass 31. In order to uniformly clothe the $SiO_2$ glass 31, the $SiO_2.Al_2O_3$ glass 11 is supported between a pair of rotating chucks 36 and 37 and is rotated uniformly and reciprocated in parallel with the side surface of the silica glass vessel. The oxygen gas carrying the high purity silicon tetrachloride vapor may be delivered from a device such as shown in FIG. 1. But in this case, the valve 20 for supplying oxygen gas to the saturator 19 containing aluminum trichloride 18 is to be closed and only the oxygen gas through the valve 21 is fed to the saturator 17 carrying silicon tetrachloride vapor and then led to the nozzles 33 and 34. The mixed gas producing device is not shown in FIG. 2 to simplify the drawing.

By the abovementioned process, the high purity $SiO_2$ glass is uniformly coated on the $SiO_2.Al_2O_3$ glass core rod 11. Thus coated glass core rod is heated in a suitable protector at a temperature above the softening point of the core rod, for instance, at 1,900°C and an optical fiber is obtained by spinning.

EXAMPLE 2

At first as shown in FIG. 1, a refractory mandrel 6 made of silica being rotatably and movably arranged in a silica glass vessel 4 is preheated by an electric furnace 7 and heated by a laser beam 2 emitted from a carbon dioxide gas laser 1 at a temperature between 1,600°–1,800°C. Toward the refractory mandrel 6 a mixed gas of oxygen and pure silicon tetrachloride vapor and pure aluminum trichloride vapor is ejected. Silicon dioxide and aluminum oxide are deposited on the rotating and moving refractory mandrel 6 and are fused. The fused silica glass rod containing aluminum oxide is grown on the mandrel 6. The mole ratio between $SiO_2$ and $Al_2O_3$ is 96% ($SiO_2$) and 4% ($Al_2O_3$). The refractive index of the glass rod is 1.466.

Thus obtained $SiO_2.Al_2O_3$ glass core rod 11 is then placed in an apparatus as shown in FIG. 2 and is supported by a pair of rotating chucks 36 and 37 in a silica glass vessel 4 preheated by an electric furnace 7. The $SiO_2.Al_2O_3$ core glass rod 11 is reciprocated in parallel with the side surface of the silica glass vessel 4 while rotating it. A mixed gas of oxygen and pure silicon tetrachloride vapor and aluminum trichloride vapor fed to the nozzles 33 and 34 is ejected toward the surface of the $SiO_2.Al_2O_3$ core glass rod 11. The mixed gas is obtained in a manner the same as explained in the foregoing examples. At first the clothing is carried at a composition rate of silicon oxide and aluminum oxide just the same as that for the production of the $SiO_2.Al_2O_3$ glass core rod 11. Then the composition rate of $SiO_2$ and $Al_2O_3$ is varied gradually by controlling the vapor pressure of the silicon tetrachloride and of aluminum trichloride so as to decrease the content of aluminum oxide and finally the coating is carried upto a rate in which silicon oxide ($SiO_2$) is 100%. As the result, a cladding glass layer 31 having its composition rate gradually changing from $SiO_2.Al_2O_3$ to $SiO_2$ from the glass core rod 11 toward the surface of the cladding may be obtained on the core rod 11. The thus obtained coated rod is spun by heating it above its softening temperature.

EXAMPLE 3

Figure 3:
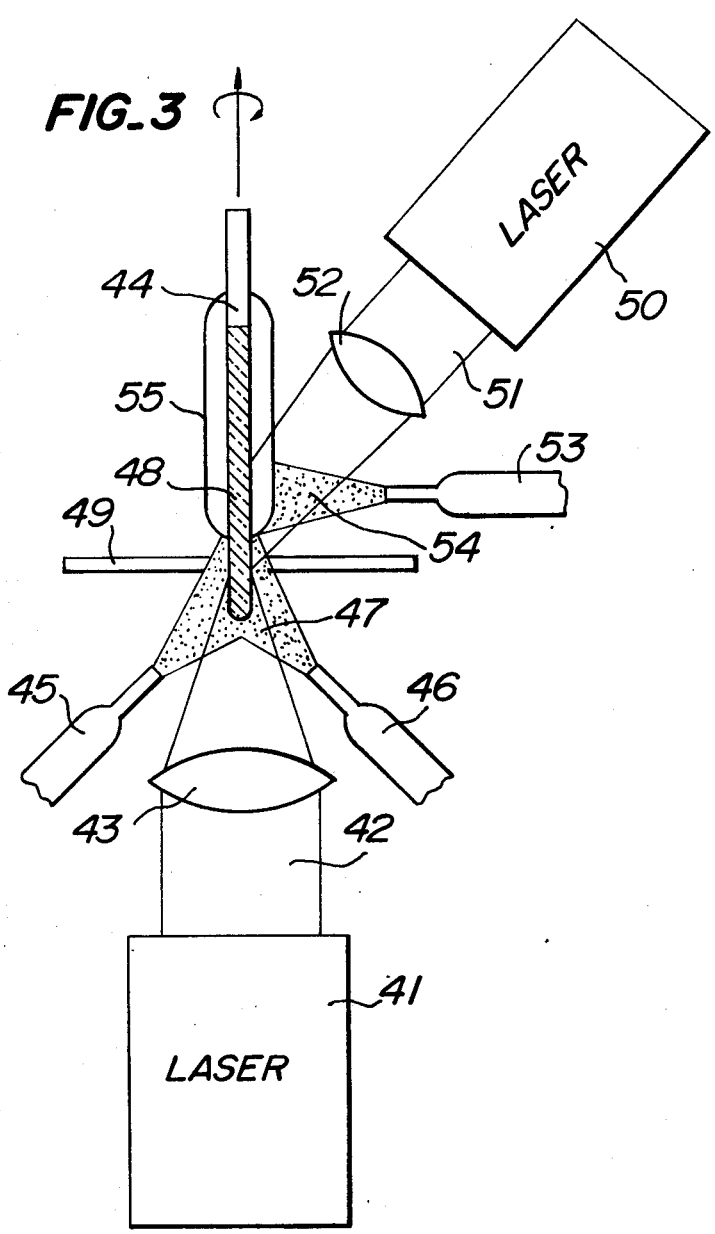
FIG. 3 is an explanatory diagram for showing the principle of the continuous manufacture of the glass core and the cladding layer.

FIG. 3 illustrates the principle of another embodiment of the present invention in which the glass core and the cladding layer are manufactured continuously. The device for producing a mixture of oxygen gas and pure silicon tetrachloride vapor and aluminum trichloride vapor is same as shown in FIG. 1 so such is not shown in FIG. 3. A laser beam 42 emitted from a carbon dioxide gas laser 41 is collected by a germanium convex lens 43 and is concentrated at the top of a refractory mandrel 44 made of, for instance, silica to heat the top portion about 1,600°–1,800°C. At the same time, a mixed gas 47 of oxygen and pure silicon tetrachloride vapor and aluminum trichloride vapor ejected from nozzles 45 and 46 is led to the top portion of the mandrel 44. As the result the following reaction occurs on the refractory mandrel 44.

$$O_2 + SiCl_4 \rightarrow SiO_2 + 2Cl_2$$

$$3O_2 + 4AlCl_3 \rightarrow 2Al_2O_3 + 6Cl_2$$

Namely the silicon tetrachloride and the aluminum trichloride react with the oxygen gas and change to silicon oxide and aluminum oxide respectively and deposit on the refractory mandrel 44 to form $SiO_2.Al_2O_3$ glass core 48. The $SiO_2.Al_2O_3$ glass core 48 is moved by the refractory mandrel 44 in the direction of the laser beam 42 at a speed equivalent to the growing speed of the $SiO_2.Al_2O_3$ glass core 48. At this time the $SiO_2.Al_2O_3$ glass core 48 is passed through a hole provided in a shielding plate 49 made of a refractory material and moved by the refractory mandrel 44. In parallel with the above process, a laser beam 51 emitted from a carbon dioxide gas laser 50 and collected by a convex lens 52 is irradiated at the surface of the thus formed $SiO_2.Al_2O_3$ glass core 48 to heat it to about 1,600°–1,800°C. At the same time a mixture 54 of oxygen gas and pure silicon tetrachloride vapor ejected from another nozzle 53 is led to the $SiO_2.Al_2O_3$ glass core 48. In this process $SiO_2$ glass 55 is clothed around $SiO_2.Al_2O_3$ glass core 48. Accordingly a silica glass cladding layer is formed on the surface of the glass core formed in the preceding process. In one embodiment, the $SiO_2.Al_2O_3$ glass 48 has a mole ratio of $SiO_2$:$Al_2O_3$=96%:4% and a refractory index is 1,466.

EXAMPLE 4

Figure 4:
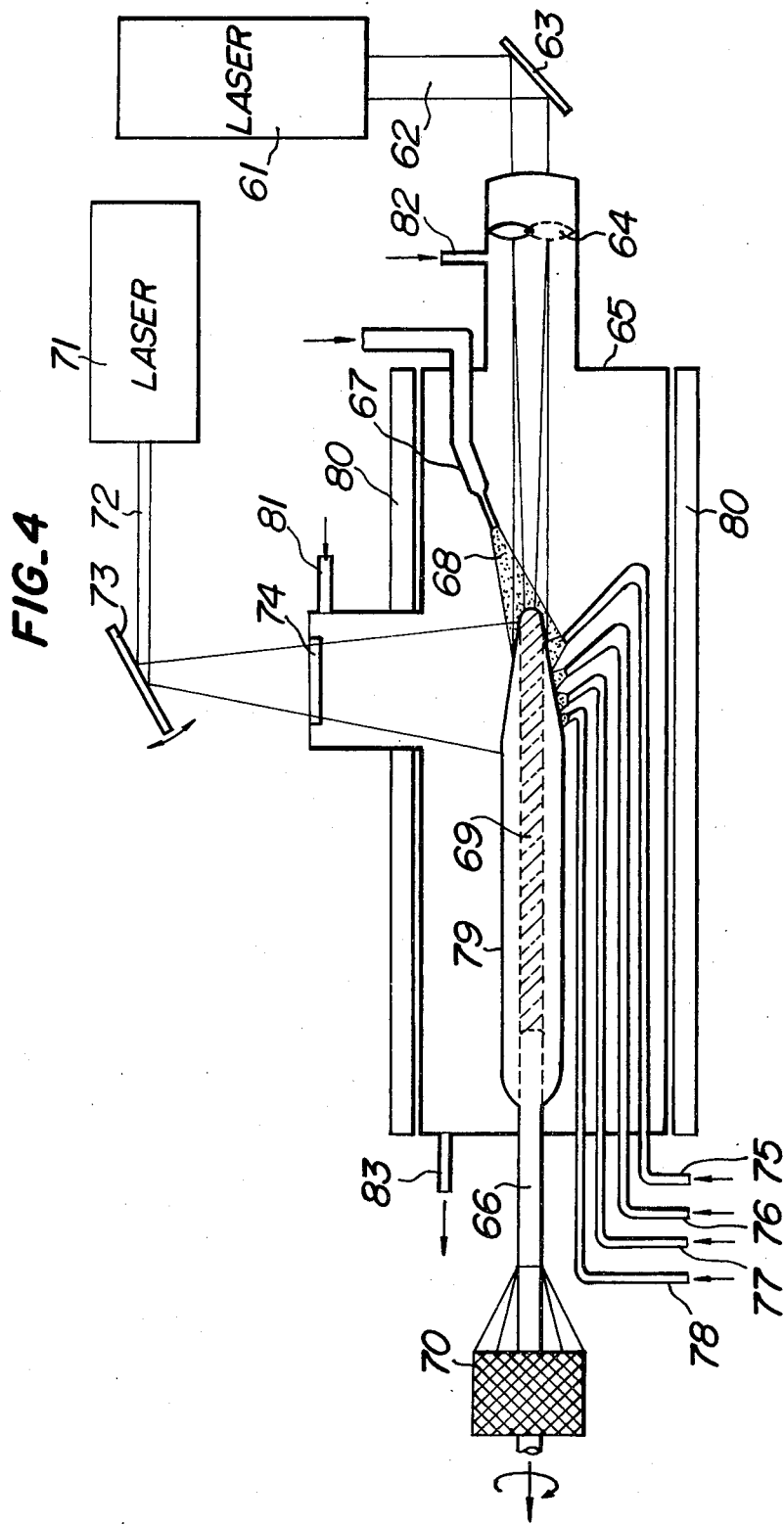
FIG. 4 shows another embodiment of the apparatus for the continuous manufacture of the glass core clothed with the cladding layer.

FIG. 4 shows a different embodiment for continuously manufacturing the glass core rod and the cladding glass layer. A laser beam 62 emitted from a carbon dioxide gas laser 61 is reflected by a mirror 63 and the diameter of the beam is widened by a rotating lens 64 to obtain a uniform power distribution and is irradiated at the top of a refractory mandrel 66 made of silica accommodated in a silica glass vessel 65 to heat this portion at a temperature of about 1,600°–1,800°C. At the same time, a mixture 68 of oxygen gas and pure silicon tetrachloride vapor and aluminum trichloride vapour ejected from a nozzle 67 is led to the refractory mandrel 66. By this operation, the following reaction occurs on the refractory mandrel 66.

Namely, the silicon tetrachloride and the aluminum trichloride react with the oxygen gas and change to silicon oxide and aluminum oxide respectively and deposit on the surface of the refractory mandrel 66 to form $SiO_2.Al_2O_3$ glass 69. The $SiO_2.Al_2O_3$ glass 69 is rotated by the mandrel 66 which is driven by a chuck 70 and is moved at the same speed as the growing speed of the $SiO_2.Al_2O_3$ glass in the direction of the laser beam. At the same time a laser beam 72 emitted from a carbon dioxide gas laser 71 is reflected by a beam scanner 73 and irradiated on the $SiO_2.Al_2O_3$ glass core 69 through a germanium window 74 with a suitable diverging angle to heat the surface to about 1,600°–1,800°C. At the same time a mixture of oxygen gas and pure silicon tetrachloride vapor and aluminum trichloride vapor is ejected onto the surface of the core rod through nozzles 75, 76, 77 and 78. The mixing rate of this mixture gas is gradually changed from the nozzle 75 which is kept at the vapor pressure rate for manufacturing the $SiO_2.Al_2O_3$ glass core to decrease the quantity of aluminum trichloride vapor toward nozzle 78. Namely, as for example the respective nozzle ejects the following mixed gas.

| nozzle 75 | $SiCl_4:AlCl_3$ | = | 95 wt.%:5 wt.% |
|---|---|---|---|
| nozzle 76 | $SiCl_4:AlCl_3$ | = | 97 wt.%:3 wt.% |
| nozzle 77 | $SiCl_4:AlCl_3$ | = | 98 wt.%:2 wt.% |
| nozzle 78 | $SiCl_4:AlCl_3$ | = | 100 wt.%:0 wt.% |

By controlling the mixed rate of the mixture gas of the oxygen and silicon tetrachloride vapor and aluminum trichloride vapor to vary the content ratio of the obtained $SiO_2$ and $Al_2O_3$ finally the surface coating is made at a rate of $SiO_2$ 100%. By this process, a cladding layer having a gradually varying composition rate of $SiO_2$ and $Al_2O_3$ in the direction of thickness of the cladding layer clothed on the $SiO_2.Al_2O_3$ glass core is obtained.

The mixture of the oxygen and silicon

In vapor and aluminum trichloride vapor ejected from the nozzles 67, 75, 76, 77 and 78 may be heated by a heating furnace 80 at a temperature of about 1,000°C to react to form solid particles by a reaction with the oxygen. The solid particles deposit on the refractory mandrel 66 and then heated by the laser beams 62 and 72 and change to glass. This is one very effective method for improving the efficiency of forming glass. In order to avoid contamination of the germanium window 74 and the rotating lens 64 an oxygen gas may be introduced into the vessel 65 through supply inlets 81 and 82. The oxygen gas is exhausted through an outlet tube 83. The obtained glass core 69 and glass cladding 79 are heated above the softening temperature and an optical fiber may be obtained by spinning. Thus obtained fiber has much less impurity and water content, which had been a cause of the absorption loss and the scattering loss and also the fiber has a uniform diameter and uniform quality to a considerably improved extent.

What is claimed is:

1. A method for manufacturing an optical fiber comprising the steps of,
    a. forming a fused silica glass core rod containing dopant by heating a rotatable and movable refractory mandrel by means of an irradiation of a carbon dioxide gas laser beam at a high temperature and by ejecting a mixed gas of oxygen and oxidizable silicon compound vapor and vapor of an oxidizable compound forming dopant to the refractory mandrel while rotating and moving said refractory mandrel so as to deposit silicon oxide and an oxide of said dopant thereon and by fusing the deposited oxides,
    b. forming a fused silica glass cladding layer on said glass core rod by heating the surface of the glass core rod by means of an irradiation of a carbon dioxide gas laser beam at a high temperature and by ejecting a mixed gas of oxygen and oxidizable silicon compound to the surface of said glass core rod while rotating and moving the glass core rod so as to deposit silicon oxide on the surface of the glass core rod and by fusing the deposited silicon oxide, and
    c. forming the optical fiber by heating a preform consisting of said glass core rod and said glass cladding layer at a temperature above the softening point of said preform and by spinning the heated preform.

2. A method for manufacturing an optical fiber comprising the steps of,
    a. forming a fused silica glass core rod containing dopant by heating a rotatable and movable refractory mandrel by means of an irradiation of a carbon dioxide gas laser beam at a high temperature and by ejecting a mixed gas of oxygen and oxidizable silicon compound vapor and a vapor of an oxidizable compound forming dopant to the refractory mandrel while rotating and moving said refractory mandrel so as to deposit silicon oxide and an oxide of said dopant thereon and by fusing the deposited oxides,
    b. forming a fused silica glass cladding layer containing dopant on said glass core rod by heating the surface of the glass core rod by means of an irradiation of a carbon dioxide gas laser beam at a high temperature and by ejecting a mixed gas of oxygen and an oxidizable silicon compound vapor and a vapor of an oxidizable compound forming dopant to said glass core rod while rotating and moving the glass core rod and by gradually decreasing the concentration of dopant in the mixed gas so as to deposit silicon oxide and an oxide of said dopant on the glass core rod initially and depositing dopant in gradually less concentration and finally depositing silicon oxide and by fusing the deposited oxides, and
    c. forming the optical fiber by heating a preform consisting of said glass core rod and said glass cladding layer at a temperature above the softening point of said preform and by spinning the heated preform.

3. The method for manufacturing an optical fiber as claimed in claim 1, wherein the refractory mandrel is moved at a speed corresponding to the speed of growth of the deposited oxide forming glass core rod on said refractory mandrel.

4. The method for manufacturing an optical fiber as claimed in claim 1, wherein the refractory mandrel is arranged in a silica glass vessel and the silica glass vessel is preheated at about 1,000°C by means of an electric furnace provided around the silica glass vessel.

5. The method for manufacturing an optical fiber as claimed in claim 1, wherein the surface of the refractory mandrel and of the glass core rod is heated at a temperature of 1,600°–1,800°C by the irradiation of the carbon dioxide gas laser beam.

6. The method for manufacturing an optical fiber as claimed in claim 1, wherein the refractory mandrel is made of fused silica.

7. The method for manufacturing an optical fiber as claimed in claim 1, wherein the oxidizable silicon compound is silicon tetrachloride.

8. The method for manufacturing an optical fiber as claimed in claim 1, wherein the oxidizable compound forming dopant is a compound selected from the group consisting of aluminum trichloride, triisobutylaluminum, germanium tetrachloride, titanium tetrachloride, gallium chloride, oxyphosphate and trimethylgallium.

9. The method for manufacturing an optical fiber as claimed in claim 1, wherein the mole ratio of the composition of the glass core rod is $SiO_2$, 96%; $Al_2O_3$ 4% and the refractive index is 1.466 at a wavelength of 0.5893 $\mu$m.

10. The method for manufacturing an optical fiber as claimed in claim 1, wherein the component of the fused silica glass cladding layer is pure silica and the refractive index is 1.458 at a wavelength of 0.5893 $\mu$m.

11. A method for manufacturing an optical fiber comprising the steps of,
  a. forming a glass core rod by heating a rotatable and movable silica rod arranged in a silica glass vessel preheated by an electric furnace by means of an irradiation of a carbon dioxide gas laser beam at a temperature of 1,600°–1,800°C and by ejecting a mixed gas of oxygen and pure silicon tetrachloride vapor and pure aluminum trichloride vapor to said silica rod so as to deposit silicon dioxide ($SiO_2$) and aluminum oxide ($Al_2O_3$) thereon while rotating the silica rod and moving it at a speed corresponding to the speed of growth of the deposited oxides and by fusing the deposited oxides,
  b. forming a fused silica glass cladding layer on said glass core rod by heating the glass core rod by means of an irradiation of a carbon dioxide gas laser beam at a temperature of 1,600°–1,800°C and by ejecting a mixed gas of oxygen and pure silicon tetrachloride vapor to said glass core rod so as to deposit silicon oxide thereon while rotating and moving the glass core rod and by fusing the deposited silicon dioxide, and
  c. forming the optical fiber by heating a preform consisting of said $SiO_2.Al_2O_3$ glass core and said $SiO_2$ glass cladding layer at a temperature above the softening point of said preform and by spinning the heated preform.

12. A method for manufacturing an optical fiber comprising the steps of,
  a. forming a glass core rod by heating a rotatable and movable silica rod arranged in a silica glass vessel preheated by an electric furnace by means of an irradiation of a carbon dioxide gas laser beam at a temperature of 1,600°–1,800°C and by ejecting a mixed gas of oxygen and pure silicon tetrachloride vapor and pure aluminum trichloride vapor to said silica rod so as to deposit silicon dioxide and aluminum oxide thereon while rotating the silica rod and moving it at a speed corresponding to the speed of growth of the deposited oxides and by fusing the deposited oxides,
  b. forming a fused silica glass cladding layer on said glass core rod by heating the glass core rod by means of an irradiation of a carbon dioxide gas laser beam at a temperature of 1,600°–1,800°C while rotating and moving said glass core rod and by ejecting a mixture of gas of oxygen and pure silicon tetrachloride vapor and pure aluminum trichloride vapor, wherein concentration of the aluminum trichloride in the mixed gas is gradually decreased until the concentration of silicon tetrachloride becomes 100% finally so as to form a fused silica glass cladding layer having a varying aluminum oxide concentration in the direction of thickness of the cladding layer, and
  c. forming the optical fiber by heating a preform consisting of said glass core rod and said glass cladding layer at a temperature above the softening point of said preform and by spinning the heated preform.

13. A method for manufacturing an optical fiber comprising the steps of,
  a. forming a $SiO_2.Al_2O_3$ glass core rod by heating the surface of a rotatably and movably arranged silica rod in a silica glass vessel suited for evacuation and preheated to about 1,000°C by means of an irradiation of a first carbon dioxide gas laser beam at a temperature of 1,600°–1,800°C and by ejecting a mixed gas of oxygen and pure silicon tetrachloride vapor and pure aluminum trichloride vapor to said silica rod so as to deposit silicon dioxide and aluminum oxide on the rod while rotating and moving said silica rod at a speed corresponding to the speed of growth of the deposited oxides,
  b. forming a fused $SiO_2$ glass cladding layer on said $SiO_2.Al_2O_3$ glass core rod continuously with the above step by simultaneously heating said glass core rod rotating and moving in the above step by means of an irradiation of a second carbon dioxide gas laser beam to heat the surface of the glass core rod at a temperature of 1,600°–1,800°C and by ejecting a mixed gas of oxygen and high purity silicon tetrachloride vapor so as to deposit silicon dioxide on the glass core rod and by fusing thereof, and
  c. forming the optical fiber by heating a preform consisting of said $SiO_2.Al_2O_3$ glass core rod and said $SiO_2$ glass cladding layer at a temperature above the softening point of said preform and by spinning the heated preform.

14. A method for manufacturing an optical fiber comprising the steps of,
  a. forming a $SiO_2.Al_2O_3$ glass core rod by heating the surface of a rotatably and movably arranged silica rod in a silica glass vessel suited for evacuation and preheated to about 1,000°C by means of an irradiation of a first carbon dioxide gas laser beam at a temperature of 1,600°–1,800°C and by ejecting a mixed gas of oxygen and pure silicon tetrachloride vapor and pure aluminum trichloride vapor to said silica rod so as to deposit silicon dioxide and aluminum oxide on the rod while rotating and moving said silica rod at a speed corresponding to the speed of growth of the deposited oxides.

b. forming an $SiO_2.Al_2O_3$ glass cladding layer on said $SiO_2.Al_2O_3$ glass core rod continuously with the above step by simultaneously heating said glass core rod rotating and moving in the above step by means of an irradiation of a second carbon dioxide gas laser beam to heat the surface of the glass core rod at a temperature of 1,600°–1,800°C and by ejecting a mixed gas of oxygen and high purity silicon tetrachloride vapor and high purity aluminum trichloride, so as to deposit silicon oxide and aluminum oxide, wherein the mole ratio of the silicon tetrachloride and the aluminum trichloride in the mixed gas is so controlled as to deposit 100% of silicon oxide at a final stage of deposition and to form the deposited silicon oxide and aluminum oxide layer in which the concentration of aluminum oxide is different in the direction of the thickness of the layer and by fusing the deposited oxide layer, and c. forming the optical fiber by heating a preform consisting of said glass core rod and fused silica cladding layer containing a varying concentration of the aluminum oxide content in the direction of thickness at a temperature above the softening point of said preform and by spinning the heated preform.

* * * * *